United States Patent [19]
Fujieda et al.

[11] Patent Number: 5,866,170
[45] Date of Patent: *Feb. 2, 1999

[54] TIRE PRESS

[75] Inventors: Yasuhiko Fujieda, Hudson, Ohio; Kashiro Ureshino, Hyogo, Japan

[73] Assignees: Kabushiki Kaisha Kobe Seiko Sho, Kobe, Japan; Kobelco Stewart Bolling, Inc., Hudson, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 659,397

[22] Filed: Jun. 6, 1996

[51] Int. Cl.⁶ .................................................. B29C 35/02
[52] U.S. Cl. .................................... 425/40; 425/47
[58] Field of Search ..................... 425/28.1, 34.1, 425/47, 40

[56] References Cited

U.S. PATENT DOCUMENTS

| | | | |
|---|---|---|---|
| 4,212,605 | 7/1980 | MacMillan | 425/47 |
| 4,453,902 | 6/1984 | Imbert | 425/47 |
| 4,747,765 | 5/1988 | Siegenthaler et al. | 425/52 |
| 4,779,206 | 10/1988 | Mattson et al. | 425/29 |
| 5,102,319 | 4/1992 | Hamilton et al. | 425/47 |
| 5,120,209 | 6/1992 | MacMillan | 425/47 |
| 5,330,337 | 7/1994 | Siegenthaler | 425/44 |

FOREIGN PATENT DOCUMENTS 797903  1/1981  U.S.S.R. .................................. 425/47

*Primary Examiner*—James P. Mackey
*Attorney, Agent, or Firm*—Oblon, Spivak, McClelland, Maier & Neustadt, P.C.

[57] ABSTRACT

A vertical tire press has a lower mold fixed to a lower platen mounted on a base, and an upper mold facing the lower mold and fixed to an upper platen mounted on a top slide. The top slide is moved vertically by a crank mechanism, thereby closing together or opening apart the upper and lower molds. The lower or upper platen has a cylinder structure so as to squeeze together the upper and lower molds. This vertical tire press basically employs a crank mechanism, but is free from disadvantages peculiar to a tilt-back type tire press. The vertical tire press provides good economic performance as well as advantages of an oil-hydraulic type tire press, i.e. uniform application of a squeezing force and easy adjustment of the squeezing force, without using an oil-hydraulic cylinder.

5 Claims, 4 Drawing Sheets

TIRE PRESS

BACKGROUND OF THE INVENTION

1. Field of the Invention

The present invention relates to a tire press in which upper and lower molds are opened and closed using a crank mechanism, and particularly to a high-precision economical tire press which is basically of a mechanically operated vertical type, but provides uniform application of a squeezing force between upper and lower molds and allows easy adjustment of the squeezing force.

2. Description of the Related Art

FIG. 4 shows a conventional tire press in which upper and lower molds are opened and closed using a crank mechanism. A lower mold 101 is mounted on a base 102, and an upper mold 103 is mounted to a top slide 104. A frame 105 is fixed to each side of the base 102. A vertical guide slot 106 is formed in each frame 105, and an arcuate roll guide 107 is formed along the top edge of each frame 105. A guide roll 108 is attached to each side of the top slide 104. As the guide rolls 108 slide along the respective vertical guide slots, the top slide 104 moves vertically. An auxiliary guide slot 120 is formed in each frame 105. An auxiliary guide roll 121 is rotatably attached to the tip of a corresponding arm 104a of the top slide 104 is guided along each auxiliary guide slot 120. Due to a restriction established by the auxiliary guide rolls 121 being guided along their respective auxiliary guide slots 120, as the guide rolls 108 roll on the arcuate roll guides 107, the top slide 104 retreats while tilting as illustrated in FIG. 4. The type of tire press with the top slide 104 moving in this manner is called the tilt-back type.

In order to obtain this tilt-back movement, a crank mechanism 110 adjacent to each frame 105 is used. In each crank mechanism 110, a crank gear 111 is rotatably supported by the base 102 while a link 114 is pivotably attached to a crank pin 112 of the crank gear 111 and to a connecting pin 113 of the top slide 104. Each crank gear 111 engages with a pinion gear 115, which is driven by an unillustrated driving unit so as to rotate the crank gear 111.

In FIG. 4, the crank pin 112 is positioned beyond its upper dead point. Thus, as illustrated, the top slide 104 is tilted at it raised position while the upper mold 103 is retreated and tilted backward from the lower mold 101. When the crank gear 111 rotates in the direction of arrow 116, each guide roller 108 attached to the top slide 104 rolls on the arcuate roll guide 107 in the direction of arrow 117. Due to the above-mentioned restriction established by the auxiliary guide roll 121 being guided along the auxiliary guide slot 120, the top slide 104 returns to a vertical posture. Subsequently, the guide roll 108 slides along the vertical guide roll slot 106. As the crank pin 112 approaches the lower dead point, the upper and lower molds 101 and 103 are closed together, and in addition the crank gear 111 produces a strong pulling force to squeeze together the upper and lower molds 101 and 103.

Because it employs a simple mechanism of the crank mechanism 110 for opening/closing molds and for squeezing molds together, the conventional tire press has an advantage that a tire can be produced at a relatively low cost. However, as described above, after the upper and lower molds 101 and 103 are closed together as a result of the crank pin 112 approaching the lower dead point, the crank gear 111 produces a strong pulling force through the so-called follow-up operation. This strong pulling force causes the top slide 104 and the base 102 to deflect and causes the link 114 to elongate, thereby producing a squeezing force. Accordingly, the squeezing force depends of the pulling force or the amount of the follow-up. The strong force of the follow-up operation, however, causes a strong reaction force to act on the crank gear 111, the tooth portion of the pinion gear 115, the plane bearing of the crank gear 111, and the driving unit including a driving motor and a speed reducer. This reaction load is about 40% larger than a load imposed on the driving unit of the crank mechanism, etc., during opening or closing the upper and lower molds 103 and 101. This implies a nonuniform driving torque with resultant poor efficiency, leaving room for improvement.

In the conventional tilt-back type tire press, since the top slide 104 retreats in a tilted position near the end of a mold opening operation, an increase in the crank radius cannot be directly converted to an increase in the vertical strode. Further, the conventional tilt-back type cannot meet requirements for a higher accuracy. This is because (1) the squeezing force is difficult to adjust and (2) the squeezing force is not applied evenly, which are problems peculiar to a vertical tire press using a crank mechanism.

The difficulty in adjusting the squeezing force, (1) above, is derived from the fact that it is actually quite difficult to adjust the amount of the follow-up, which determines the magnitude of the squeezing force. The uneven application of the squeezing force, (2) above, is derived from the fact that the top slide 104 and the base 102 deflect as shown in exaggerated form in FIG. 5 (a schematic front view of a main portion of a tire press showing a deflection thereof). This deflection causes the upper and lower molds 103 and 101 to contact each other obliquely at their outer circumferences, forming a clearance therebetween at their inner circumferences. As a result, a tire undergoing vulcanization in the upper and lower molds 103 and 101 is likely to protrude through the clearance, resulting in poor quality of a vulcanized tire product and a decreased yield. Also, unsymmetrical wear of the upper and lower molds 103 and 101 shortens their service lives. When the upper mold 103 is mounted to the top slide 104 via a mold height adjust screw, play of the mold adjust screw may absorb a deflection of the top slide 104, so that the bottom face of the upper mold 103 may substantially contact the top face of the lower mold 101 in a substantially uniform manner, thereby solving this unsymmetrical contact problem to some degree. However, since the lower mold 101 is directly mounted on the base 102, the lower mold 101 itself deforms due to the deflection of the base 1, resulting in an uneven distribution of a contact force over the contact face between the upper and lower molds 103 and 101.

In recent years, wide radial tires have become popular. A wide radial tire is vulcanized and formed in a mold called a segment mold, in which usually 6 to 8 segments are provided in an expandable/contractible manner. When this segment mold is opened/closed on the above-mentioned tilt-back type tire press, the segments are likely to be decentered when the top slide 104 tilts, resulting in poor accuracy.

In response to these circumstances, a vertical oil-hydraulic tire press has been developed in which the top slide is moved vertically by an oil cylinder. This oil-hydraulic cylinder type meets demands for uniform application and easy adjustment of a squeezing force, but still has the following disadvantages. An accompanying oil-hydraulic system makes the press structure complex, thereby increasing cost. In addition, an oil leak is unavoidable with a potential adhesion of oil to a green tire. Adhesion of oil to a green tire produces a valueless tire product.

SUMMARY OF THE INVENTION

The present invention has been accomplished in view of the above-mentioned problems in a conventional tire press.

An object of the present invention is to provide a vertical tire press which basically employs a crank mechanism, but is free from disadvantages peculiar to a tilt-back type tire press and which provides good economic performance as well as advantages of an oil-hydraulic type tire press, i.e. uniform application of a squeezing force and easy adjustment of the squeezing force, without using an oil-hydraulic cylinder.

According to the present invention, there is provided a tire press wherein a lower mold is fixed to a lower platen mounted on a base, and an upper mold facing the lower mold is fixed to an upper platen mounted on a top slide. The top slide is moved vertically by a crank mechanism, thereby closing together or opening apart the upper and lower molds. The lower or upper platen has a cylinder structure so as to squeeze together the upper and lower molds.

The upper and lower molds are closed together or opened apart only through the vertical movement of the top slide. Thus, in contrast to the conventional tilt-back type tire press as shown in FIG. 4 in which the top slide 104 is retreated and tilted near the end of a mold opening operation, the structure of the present invention has an advantage that an increase in a crank radius can be directly converted to an increase in the vertical stroke of the top slide 104. In order to manufacture tires for a passenger car, a vertical mechanical tire press requires a vertical stroke of 1600–1900 mm. This large stroke is obtained by increasing the crank radius. In the tire press of the present invention, a vertical stroke of 1600 mm can be obtained by increasing the crank radius to 800 mm. However, in the tilt-back type tire press, the crank radius is already 800 mm or so when the vertical stroke is about 1000 mm. Therefore, to obtain a vertical stroke of 1600 mm, the tilt-back type tire press requires the crank gear 111 to have an abnormally large radius, which significantly damages the mechanical balance of the tire press and brings about a quite noneconomic tire press. That is, the tilt-back type tire press becomes less adaptive as the tire width increases. By contrast, the tire press of the present invention has an excellent mechanical balance and can easily be adapted to cope with a request for increasing the tire size.

Since the molds are closed together or opened apart only through the vertical movement of the top slide, when a segment mold is used, segments are not decentered at the time of opening/closing the segment mold as in the case of the tilt-back type tire press, thereby eliminating one cause of poor accuracy.

In the above-mentioned "cylinder structure," the lower platen may serve as a piston and the lower platen supporting member may serve as a cylinder casing; or the upper platen may serve as a piston and the upper platen supporting member may serve as a cylinder casing. However, the cylinder structure is not limited thereto. Since this cylinder structure does not require additional members for its construction, a squeezing cylinder can be formed at relatively low cost.

As described above, according to the present invention, the upper and lower molds are vertically squeezed together directly by the lower platen or the upper platen having a cylinder structure. As a result, this squeezing operation is not affected by a deflection of the top slide and the base, which have occurred in cases where all the operation stages up to squeezing of the molds are performed by only a crank mechanism. Accordingly, the squeezing force is uniformly applied to the upper and lower molds. Since the cylinder operating pressure can be adjusted in a simple manner through a pressure regulating valve, the squeezing force can be readily adjusted, and thus a required pressing accuracy can also be readily attained. Although the tire press of the present invention is a vertical tire press employing a crank mechanism, it can produce a tire with good accuracy.

Preferably, the crank mechanism used in the present invention has a structure such that when the crank gear of the crank mechanism makes a half turn in the forward or reverse direction, the top slide slides while being guided by top slide guiding means so as to close together and open apart the upper and lower molds in the vertical direction. The lower dead point or a point near the lower dead point of the crank gear is set as a closing limit of the mold opening/closing operation. When the crank gear reaches this closing limit, the lower platen serving as cylinder is raised under pressure to squeeze together the upper and lower molds. In other words, when the crank gear reaches the lower dead point or a point near the lower dead point, the operation of squeezing the upper and lower molds is left to the cylinder structure formed by the platen and the platen supporting member. Thus, in contrast with the conventional tilt-back type tire press, a reaction force caused by squeezing does not act on the crank gear, the tooth portion of the pinion gear, and the driving unit including a speed reducer. This allows the width of the crank and pinion gears to be decreased and allows the use of a self-lubricant bushing as a plane bearing for the crank gear. By using a self-lubricant bushing, a grease lubrication unit, and piping for lubrication become unnecessary.

Since the crank mechanism is not used to squeeze together the upper and lower molds, the drive unit for the crank mechanism is only required to have power and stiffness sufficient to open apart and close together the upper and lower molds. A maximum force is required when the top slide is raised at a crank angle of near 90°. The required maximum torque is about 60% of the maximum torque which is required in the conventional tilt-back type tire press in which squeezing is performed by only the follow-up operation of the crank mechanism. Thus, a load acting on the plane bearing of the crank gear can be significantly reduced. Particularly, at a crank angle of near 90°, a force (component force) acting on the plane bearing is reduced to a great extent from the force action on the plane bearing at a crank angle of near 180° (lower dead point). Therefore, the tire press of the present invention becomes more economical. "Top slide guiding means" allows the top slide to move vertically and is realized, for example, through use of a column standing at each side of the base to guide a roll or slide member or through use of a linear motion guide provided on a column standing at the center of the base.

In the present invention, the pressurizing medium used for pressing the lower platen is preferably a pressurizing medium used for vulcanizing a tire. Since oil is not used as a pressurizing medium for pressing the lower platen as a component of the cylinder structure, a defective tire product due to adhesion of oil is not produced, and yield improves accordingly. Since equipment serving as an oil source and piping are not required, the cylinder structure becomes simple, and the cost of manufacture of the tire press can be reduced. Also, it is economical to use the same pressurizing medium to both vulcanize a tire and to operate the cylinder mechanism.

Preferably, the pressurizing medium for pressing the lower platen is nitrogen gas. In order to press the lower platen nitrogen gas is utilized which is generally used as a pressurizing medium for tire vulcanization for energy saving. Therefore, the cost of manufacture of the tire press can be further reduced.

Preferably, a guide portion is provided at the center of the lower platen such that the guide portion projects downward from the lower platen, and a hole is formed in the lower platen supporting member so as to guide the guide portion. This structure ensures the parallelism between the lower platen and the lower platen supporting member, thereby guaranteeing the smooth movement of the lower platen for a prolonged period of time.

DESCRIPTION OF THE PREFERRED EMBODIMENT

An embodiment of the present invention will now be described with reference to the drawings.

Figure 1:
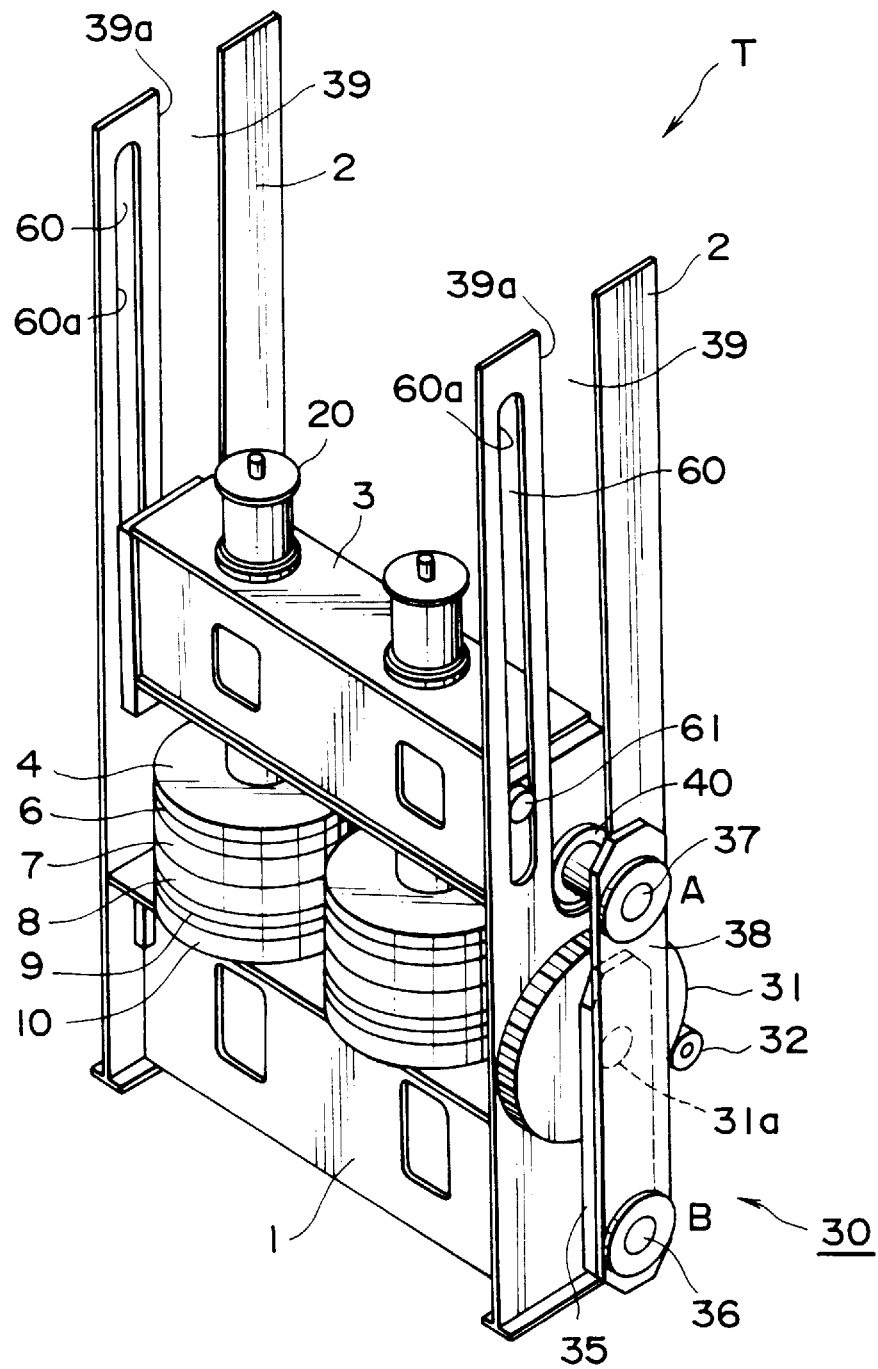
FIG. 1 is a schematic perspective view showing an embodiment of a tire press of the present invention.

In FIG. 1, a tire press T has a base 1, side frames 2, a top slide 3, and crank mechanisms 30. The base 1 supports each of lower molds 8 via a lower platen supporting member 10 and a lower platen 9. Each of the side frames 2 stands at a corresponding side of the base 1 and has a guide slot 39 and an auxiliary side slot 60 both of which extend vertically. The top slide 3 slides along the side slots 39 and the side slots 60 of the side frames 2 while holding top molds 7 called segment molds via an upper platen supporting member 4 and an upper platen 6. The crank mechanisms 30 move the top slide 3 vertically. The side slot 39 extends along a vertical line crossing the axis of crank rotation as well as the axis of a crank fulcrum and allows a slide guide 40 to slide therealong. The auxiliary side slot 60 extends vertically in parallel with the side slot 39 and allows one side of a guide roll 61 attached to the top slide 3 to slide vertically along a slot surface 60a thereof.

In the crank mechanism 30, a crank gear 31 is rotatably supported by the base 1 and the side frame 2, and a pinion gear 32 engages the crank gear 31. The pinion gear 32 is coupled with an unillustrated speed reducer, which is in turn coupled with an unillustrated driving motor, whereby the crank mechanism 30 is driven by the driving motor. An arm 35 is fixed to a pin 31a of the crank gear 31. A link 38 is connected at its one end to a tip connecting pin 36 (crank fulcrum) of the arm 35 and at the other end to a connecting pin 37 (force application point) of the top slide 3.

Figure 3:
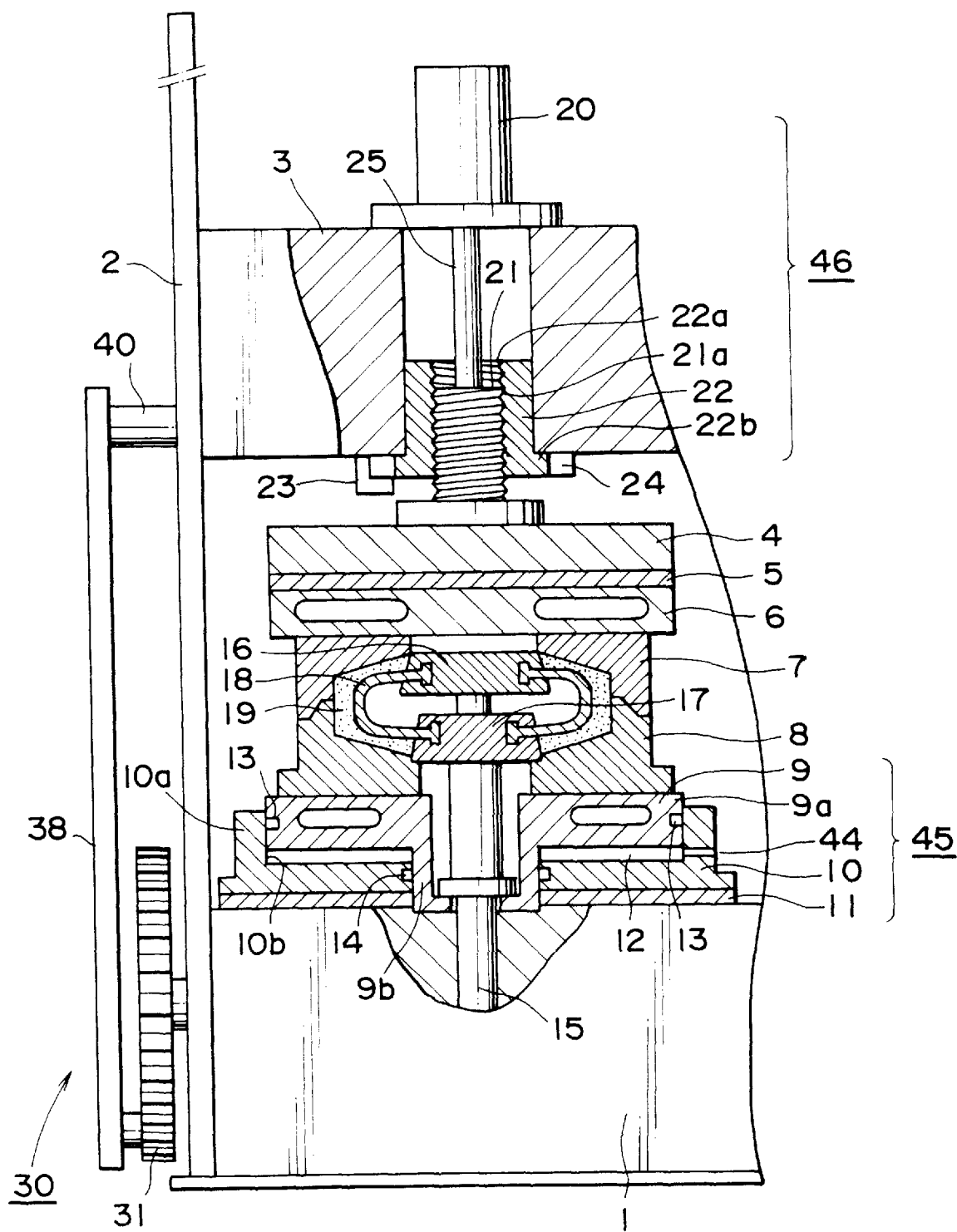
FIG. 3 is a schematic front view showing the embodiment.
Figure 4:
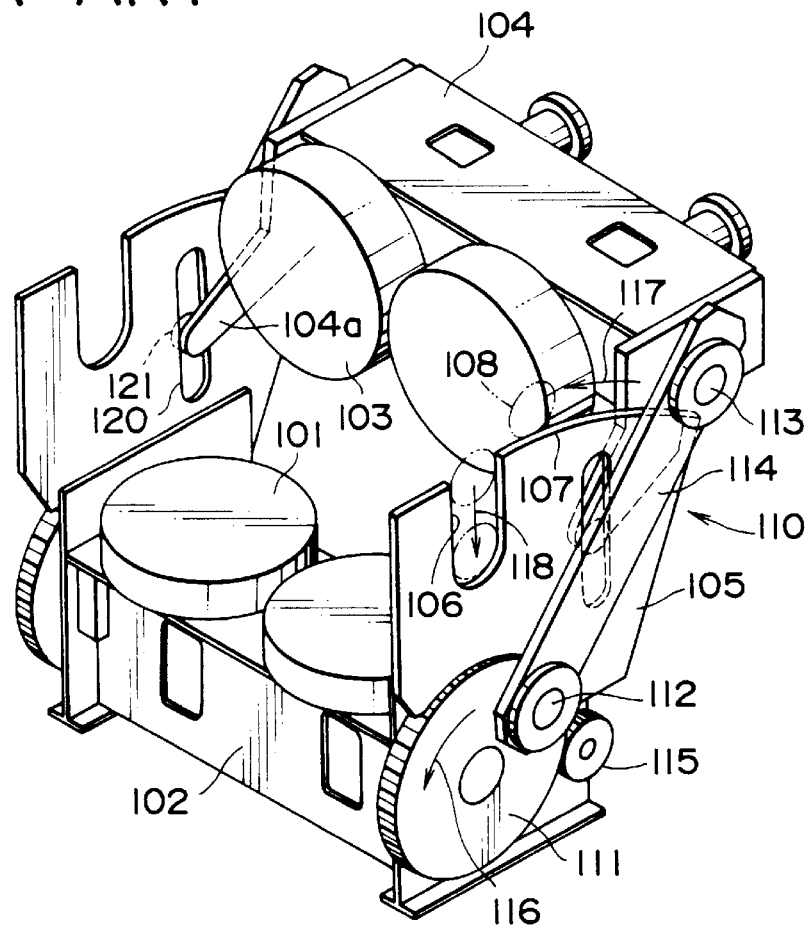
FIG. 4 is a schematic perspective view showing a conventional vertical mechanically operated tire press.
Figure 5:
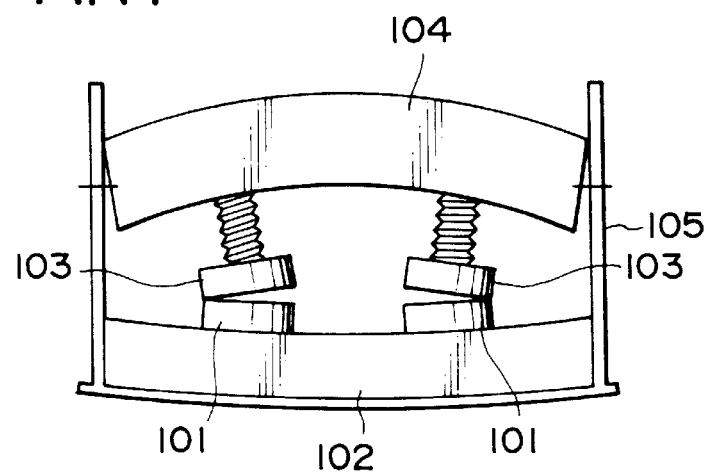
FIG. 5 is a front view of a main portion of FIG. 4.

Molds squeezing means 45 will now be described in detail. In FIG. 3, the cap-shaped lower platen supporting member 10 is disposed so as to support the disk-shaped lower platen 9 from underneath while a predetermined space 12 formed therebetween. A cylindrical portion projecting from the central portion of the lower platen 9 is slidably inserted via a seal packing 14 into a through-hole formed at the central portion of the lower platen supporting member 10. A circumferential surface 9a of the lower platen 9 is slidably fitted via a seal packing 13 to an inner circumferential surface 10b of a flange 10a, which projects upward along the circumferential portion of the lower platen supporting member 10. A pressurized working fluid is supplied into the space 12 through a passage 44 by an unillustrated fluid supply means. This structure functions as the molds squeezing means 45.

The molds squeezing means 45 functions as follows. When a pressurized working fluid is supplied into the space 12, it presses the lower platen 9 serving as a piston toward the top slide 3, thereby generating a predetermined squeezing force between the upper mold 7 and the lower mold 8. On the other hand, when the working fluid is discharged through the passage 44, the lower platen 9 serving as a piston lowers by its own weight into the space 12 serving as a cylinder chamber. The working fluid or pressurized medium to be supplied into the space 12 is the same as an inert gas, namely nitrogen gas, to be supplied into a bladder 18. Since the diameter of the space 12 is greater than that of the bladder 18 during vulcanizing a tire, the upper and lower molds 7 and 8 will not open apart while a tire is being vulcanized.

The lower mold 8 is placed on the top face of the lower platen 9 and heated by a heat source provided in the lower platen 9 during vulcanization. The upper mold 7 is disposed above the lower mold 8. A green tire 19 is loaded into acavity which is formed by the upper and lower molds 7 and 8. The upper mold 7 is fixed to the top slide 3 via the upper platen 6, which has a built-in heating source as the lower platen 9, and an adjust screw 21. A heat insulator 5 is interposed between the upper platen 6 and the upper platen supporting member 4 while a heat insulator 11 is interposed between the lower platen supporting member 10 and the base 1, thereby preventing a heat loss from the upper and lower platens 6 and 9.

The upper platen supporting member 4 is supported by the top slide 3 via mold height adjusting means 46. The mold height adjusting means 46 has an adjust screw 21 (a rod having male threads 21a on the outer circumference thereof) mounted upright on the top face of the upper platen supporting member 4 at the central portion thereof and a nut member 22 inserted rotatably into the top slide 3. Female threads 22a are formed in the inner circumferential surface of the nut member 22 so as to engage with the male threads 21a. A gear member 22b is fixed to the outer circumference of the bottom portion of the nut member 22 such that it projects downward from the bottom face of the top slide 3. A stopper 23 supports the nut member 22 and allows it to rotate freely. The gear member 22b engages with a pinion 24, which is rotatably supported by the top slide 3. Thus, when the pinion 24 is rotated by an unillustrated driving means, the adjust screw 21 moves vertically over a distance corresponding to revolutions of the pinion 24.

A center mechanism 15 is provided through the lower mold 8 at the central portion thereof. Support rings 16 and 17, which constitute the central portion of the center mechanism 15, support the bladder 18. The bladder 18 presses outward the inner surface of the green tire 19 loaded in the cavity. On the other hand, segment mold operating mechanism is constructed as follows. An operating cylinder 20 is mounted on the top slide 3, and an operating rod 25 extends downward in the vertical direction from the operating cylinder 20. The operating rod 25 is connected to the central portion of the top face of the upper platen 4 via a so-called bayonet mechanism. Segments of the segment mold (upper mold 7) can be attached/detached by locking/unlocking the bayonet mechanism.

The top slide 3, which supports the upper mold 7 via the upper platen 6, the upper platen supporting member 4, and the mold height adjusting means 46, is supported by the slide guides 40. The slide guide 40 also serves as the connecting pin (force application point) of the crank mechanism 30. As the crank mechanism 30 operates, the top slide 3 moves between the bottom position of its stroke shown in FIG. 1 and the top position shown in FIG. 2.

Figure 2:
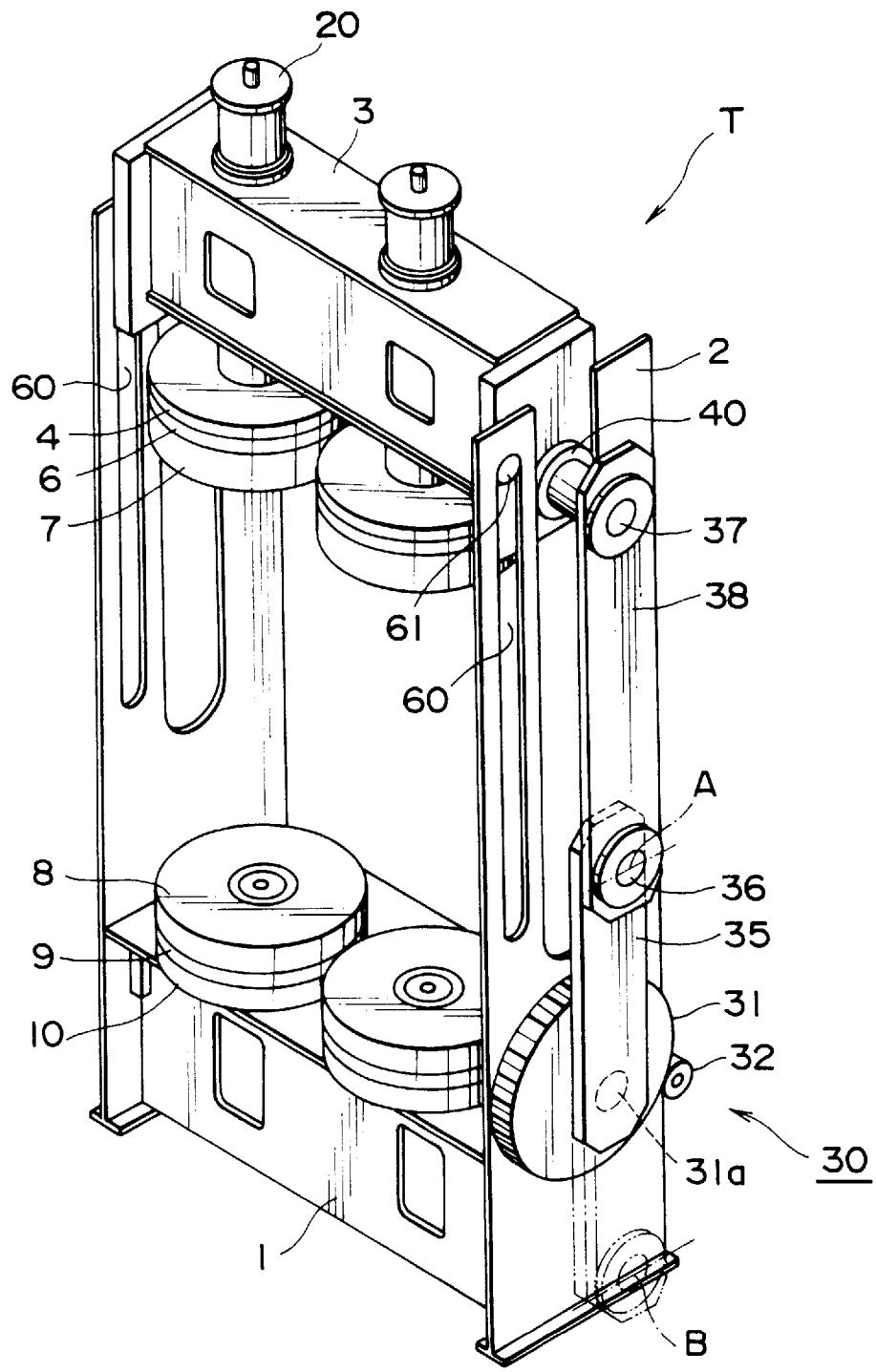
FIG. 2 is a schematic perspective view showing the embodiment of the tirepress with the top slide thereof positioned at the upper limit of its stroke.

The operation of the tire press T having the above-mentioned structure will now be described. FIG. 2 shows the state of the tire press before a green tire is loaded into the upper and lower molds 7 and 8. The tip connecting pin 36 (crank fulcrum) of the arm 35 rotates in a reciprocative manner between the position near the upper dead point of a crank stroke (point A) and the position near the lower dead point as the crank gear 31 alternates a half turn in the forward direction and a half turn in the reverse direction. When the arm 35 is positioned at point A, the connecting pin 37 (force application point) of the link 38 is positioned at the upper limit of its stroke, where the upper mold 7 is opened apart from the lower mold 8. When the arm 35 is positioned at point B, the connecting pin 37 is positioned at the lower limit of its stroke, where the upper and lower molds 7 and 8 are closed together, followed by the molds squeezing means 45 squeezing together the upper and lower molds 7 and 8.

When the green tire 19 is place in the lower mold 8, the crank mechanism 30 is operated to lower the top slide 3 to the lower limit of its stroke, thereby closing together the upper and lower molds 7 and 8. Then, as shown in FIG. 3, nitrogen gas as a pressurizing medium is supplied under pressure into the space 12 of the molds squeezing means 45. The pressurized nitrogen gas presses up the lower platen 9 serving as a piston, thereby pressing up the lower mold 8 against the upper mold 7. When the upper and lower molds 7 and 8 are thus squeezed by a predetermined squeezing force, the upper and lower molds 7 and 8 are heated while the bladder 18 presses outward the inner surface of the green tire 19 loaded in the cavity, thereby vulcanizing the green tire 19 into a predetermined form.

A guide portion 9b, i.e. a cylindrical portion projecting downward from the central portion of the lower platen 9, allows the lower platen 9 to smoothly reciprocate in the cylinder casing. In other words, although the present embodiment provides a special cylinder structure where the thickness (L) of the lower platen 9 serving as a piston is relatively small as compared to the diameter (D) thereof (i.e., the ratio L/D is relatively small), the above-mentioned structure ensures the parallelism between the lower platen 9 and the lower platen supporting member 10, thereby guaranteeing the smooth movement of the lower platen 9 for a prolonged period of time. This makes it possible to perform the squeezing operation more accurately and more reliably.

Upon completion of vulcanization, nitrogen gas is released through the passage 44. As a result, the lower platen 9 lowers by its own weight to the initial position in the space 12 serving as a cylinder chamber. Also, in this case, the guide portion 9b ensures the smooth return of the lower platen 9 to the initial position. At the same time, the segment mold operating mechanism expands segments (not shown) of the upper mold 7. Thereafter, the crank mechanism 30 is operated again. The crank gear 31 is rotated by a half turn in the direction opposite to the direction when lowering the top slide 3, so as to raise the top slide 3 to the upper limit of its stroke as shown in FIG. 2. This completes the mold opening operation.

When the green tire 19 of different specifications is to be vulcanized, the upper and lower molds 7 and 8 are replaced with those having corresponding specifications. This replacement of molds may involve a change in mold height. In response to this change in mold height, the vertical position of the upper mold 8 is adjusted by rotating the pinion 24 accordingly. The nut member 22 is engaged with the mail threads 21a of the adjust screw 21. Since the adjust screw 21 is fixed so as not to rotate, the adjust screw 21 moves vertically as the nut member 22 rotates in response to rotation of the pinion 24, whereby the height of the upper mold 7 is adjusted in accordance with a change in mold height.

As described above, in the present embodiment, the movement of the upper mold 7 along its stroke between the upper and lower limits is performed only through the vertical movement of the top slide 3 operated by the crank mechanism 30. Accordingly, in distinction from the conventional tilt-back type tire press, in which a top slide retreats in a tilted posture near the end of the mold opening operation, an increase in the crank radius can be directly converted into an increase in the vertical stroke of the top slide. This allows the tire press to readily meet a demand for increase in the tire width, makes the tire press economical, and provides the tire press with excellent mechanical balance. Since the mold opening/closing operation is achieved only by the upper mold 7 moving vertically, segments of the segment mold are not decentered in contrast with the conventional tilt-back type tire press which has a problem of segments being decentered during opening/closing molds. Thus, one cause of poor accuracy is eliminated.

In the tire press of the present embodiment, the molds squeezing means 45 does not require a separately provided oil-hydraulic cylinder. That is, a hydraulic oil is not used as a pressurizing medium. A pressurizing medium for the bladder 18, preferably nitrogen gas, is used as the pressurizing medium for the molds squeezing means 45. The cylinder structure is simply formed by the lower platen 9 serving as a piston and the lower platen supporting member 10 serving as a cylinder casing. This cylinder structure may be readily obtained by modifying the conventional lower platen and lower platen supporting member. The lower platen 9 and the lower platen supporting member 10 are originally of a disk having substantially the same diameter. The diameter of the lower platen 9 is reduced, a groove is formed in its circumferential surface for accommodating the seal packing 13. A short ring is attached to the outer circumferential edge of the lower platen supporting member 10 so as to form the flange 10a. The lower platen 9 is fitted inside the flange 10a such that the inner circumferential surface 10b of the flange 10a slidably contacts via the seal packing 13 the outer circumferential surface 9a of the lower platen 9, thereby forming a molds squeezing cylinder. In view of the fact that the ratio L/D of the lower platen 9 is relatively small, in order to maintain parallelism between the lower platen 9 and the lower platen supporting member 10 for ensuring accuracy of the vertical movement of the lower platen 9, it is preferable that the guide portion 9b be provided at the central portion of the lower platen 9 as shown in FIG. 3.

In the present embodiment, the cylinder structure is formed by the lower platen 9 and the lower platen supporting member 10. Thus, the lower platen 9 can absorb a deflection of the top slide 3 as well as the base 1 which is generated due to the follow-up operation of the crank mechanism 30 as observed with the conventional tilt-back type tire press, whereby the upper and lower molds 7 and 8 can be uniformly squeezed together. Further, since the cylinder operating pressure can be adjusted in a simple manner using a pressure regulating valve, the squeezing force can be readily adjusted, and thus a required accuracy can also be readily attained.

Because of the molds squeezing means 45, there is no need for an additional squeezing cylinder, and a defective tire product due to adhesion of oil is not produced in contrast with the conventional oil-hydraulic cylinder type tire press, thereby improving yield. Further, a pressurizing medium to be supplied into the bladder 18 can also be used as that for the molds squeezing means 45, and particularly nitrogen gas can be used for energy saving. Hence, the conventionally required equipment serving as an oil source and piping can be omitted, thereby simplifying maintenance. This, together with the above-mentioned simple cylinder structure serving as mold squeezing means, reduces cost of manufacture of the tire press.

The upper and lower molds 7 and 8 are opened apart/closed together by the crank gear 31 rotating a half turn in the regular/reverse direction. When the crank gear 31 approaches the lower dead point, the molds squeezing means 45 is activated. That is, when the crank gear 31 reaches point B, the molds squeezing operation is left to the cylinder structure composed of the lower platen 9 and the lower platen supporting member 10. As a result, in distinction from the conventional tilt-back type tire press, a reaction force caused by squeezing does not act on the crank gear 31, the tooth portion of the pinion gear 32, and the driving unit including a speed reducer. A maximum torque required for raising the top slide 3 is about 60% that of the conventional tilt-back type tire press. This greatly reduces a load imposed on the plane bearing which supports the crank gear 31.

Since the crank gear 31 rotates only a half turn, it is not necessary to cut gear teeth along the entire circumference of the crank gear 31. Also, if a relatively large crank radius can be used, the angle of rotation of the crank gear 31 is not necessarily 180°, but may be smaller.

In the present embodiment, nitrogen gas is used as a pressurizing medium to be supplied to the molds squeezing means 45. However, when hot water or steam is used as a pressuring medium for tire vulcanization, they may also be supplied to the molds squeezing means 45, and so acts as a built-in heating source for the piston structure.

In the present embodiment, the cylinder structure employed by the molds squeezing means 45 is of the single acting type, but may be of the double acting type. Further, a spring force or the like may be used to return the piston of the cylinder structure back to its original position. Also, in the present embodiment, the cylinder structure for mold squeezing is formed by the lower platen 9 and the lower platen supporting member 10, but may be formed of the upper platen 6 and the upper platen supporting member 4.

The above-described tire press is of the two-cavity type. However, the present invention may also be applicable to the one-cavity type tire press for vulcanizing a large-sized tire such as an OTR tire and the like.

What is claimed is:

1. A tire press comprising:

a lower mold fixed to a lower platen mounted on a base;

an upper mold facing said lower mold and fixed to an upper platen mounted on a top slide;

means for supplying steam to said upper and lower molds for vulcanizing a tire therein;

a crank mechanism for vertically moving said top slide so as to close together or open apart said upper and lower molds;

a cylinder structure provided in said lower platen or said upper platen and adapted to squeeze together said upper and lower molds, said cylinder structure being actuated by a high pressure medium comprising the steam supplied to said molds for vulcanizing a tire; and a piston structure of said cylinder structure, said piston structure comprising a built-in heating source for vulcanizing a tire, said built-in heating source comprising the steam supplied to said molds for vulcanizing a tire.

2. A tire press according to claim 1, wherein said cylinder structure is provided in said lower platen.

3. A tire press according to claim 2, wherein said crank mechanism has a structure such that when a crank gear of said crank mechanism makes a half turn in the forward or reverse direction, said top slide vertically slides, while being guided by top slide guiding means, so as to perform a mold closing/opening operation in the vertical direction, and a lower dead point or a point near the lower dead point of said crank gear is set as a closing limit of the mold opening/closing operation, at which said lower platen having said cylinder structure is raised under pressure so as to squeeze together said upper and lower molds.

4. A tire press according to claim 2, further comprising a lower platen supporting member for supporting said lower platen for vertical movement, wherein a cylinder chamber is formed between said lower platen serving as said piston structure and said lower platen supporting member serving as said cylinder structure.

5. A tire press according to claim 4, wherein a guide portion is provided at the center of said lower platen such that said guide portion projects downward from said lower platen, and a hole is formed in said lower platen supporting member so as to guide said guide portion.

* * * * *